US012629598B2

(12) United States Patent       (10) Patent No.:    US 12,629,598 B2

He et al.                            (45) Date of Patent:    *May 19, 2026

(54) DYNAMIC EVENT-BASED RANKING METHODS AND SYSTEMS

(71) Applicant: Riot Games, Inc., Los Angeles, CA (US)

(72) Inventors: Yilin He, Los Angeles, CA (US); Sean Szopinski, Los Angeles, CA (US)

(73) Assignee: Riot Games, Inc., Los Angeles, CA (US)

( * ) Notice:    Subject to any disclaimer, the term of this patent is extended or adjusted under 35 U.S.C. 154(b) by 143 days.

This patent is subject to a terminal disclaimer.

(21) Appl. No.: 18/061,184

(22) Filed:    Dec. 2, 2022

(65)            Prior Publication Data

US 2023/0116322 A1      Apr. 13, 2023

Related U.S. Application Data

(63) Continuation of application No. 17/223,730, filed on Apr. 6, 2021, now Pat. No. 11,517,824.

(60) Provisional application No. 63/006,332, filed on Apr. 7, 2020.

(51) Int. Cl.
    *A63F 13/798*          (2014.01)
(52) U.S. Cl.
    CPC .................................. *A63F 13/798* (2014.09)
(58) Field of Classification Search
    None
    See application file for complete search history.

(56)              References Cited

U.S. PATENT DOCUMENTS

| | | | |
|---|---|---|---|
| 8,968,067 | B1 | 3/2015 | Curtis et al. |
| 2003/0216184 | A1 | 11/2003 | Kigoshi |
| 2004/0092313 | A1 | 5/2004 | Saito et al. |
| 2004/0143852 | A1 | 7/2004 | Meyers |
| 2005/0021159 | A1 | 1/2005 | Ogawa |
| 2007/0004507 | A1 | 1/2007 | Nakajima et al. |

(Continued)

OTHER PUBLICATIONS

Extended European Search Report and Search Opinion received for European Application No. 21783969.5, mailed on Mar. 7, 2024, 7 pages.

(Continued)

*Primary Examiner* — Tramar Harper
(74) *Attorney, Agent, or Firm* — Shook, Hardy & Bacon L.L.P.

(57)              ABSTRACT

Systems and methods for dynamic events-based ranking servers including a processor. The server also includes a memory communicatively coupled to the processor. The memory includes at least event data, player skill data, and game logic, which is configured to be processed by the processor in order to execute a game with a plurality of players until a game conclusion is reached. The memory further includes event capture logic that is configured to be processed by the processor to identify a plurality of events within the executed game. The events to be captured are done so prior to the game conclusion. Also, the captured event data can relate to the plurality of events. Finally, the memory includes an event update logic, which is configured to be processed by the processor to update player skill data scores in response to the event data captured during the game.

20 Claims, 8 Drawing Sheets

(56) References Cited

U.S. PATENT DOCUMENTS

| | | | | |
|---|---|---|---|---|
| 2009/0143137 A1 | 6/2009 | Asano | | |
| 2010/0056275 A1* | 3/2010 | Wilson | .................... | A63F 13/30 |
| | | | | 463/43 |
| 2010/0291999 A1 | 11/2010 | Nagatomo et al. | | |
| 2011/0124417 A1* | 5/2011 | Baynes | ................. | A63F 13/798 |
| | | | | 463/43 |
| 2011/0244965 A1 | 10/2011 | Takahashi | | |
| 2012/0122552 A1* | 5/2012 | Youm | ..................... | A63F 13/77 |
| | | | | 463/23 |
| 2012/0323348 A1* | 12/2012 | Joo | ......................... | A63F 13/34 |
| | | | | 700/92 |
| 2013/0084969 A1* | 4/2013 | Knoles | .................. | A63F 13/798 |
| | | | | 463/29 |
| 2013/0344963 A1* | 12/2013 | Gupta | ................... | A63F 9/0611 |
| | | | | 463/40 |
| 2014/0024445 A1* | 1/2014 | Aller | ................... | G07F 17/3225 |
| | | | | 463/29 |
| 2014/0066191 A1 | 3/2014 | Yang | | |
| 2014/0087882 A1 | 3/2014 | Matsumoto et al. | | |
| 2014/0243088 A1 | 8/2014 | Oikawa | | |
| 2014/0274401 A1 | 9/2014 | Oono | | |
| 2015/0286699 A1 | 10/2015 | Kawasaki et al. | | |
| 2018/0001212 A1* | 1/2018 | Simmer | ................ | A63F 13/798 |
| 2018/0161675 A1* | 6/2018 | Miron | ................... | A63F 13/822 |
| 2019/0201793 A1 | 7/2019 | Kurabayashi | | |

OTHER PUBLICATIONS

International Preliminary Report on Patentability received for PCT Patent Application No. PCT/US2021/026025, mailed on Oct. 20, 2022, 8 pages.
International Search Report and Written Opinion received for PCT Patent Application No. PCT/US2021/026025, mailed on Jul. 8, 2021, 8 pages.
Office Action received for Chinese Patent Application No. 202180027363.2, mailed on Apr. 1, 2025, 18 pages (9 pages of English Translation and 9 pages of Original Office Action).

* cited by examiner

*600*

ROUND EVENT FINISHED — *610*

ENTER ROUND EVALUATION — *620*

RECEIVE AND PARSE ROUND DATA — *630*

DETERMINE EACH PLAYER'S CONTRIBUTION — *640*

GENERATE PRE-ROUND OUTCOME PREDICTIONS BASED ON EACH PLAYER'S ENCOUNTER SKILL, ROUND WIN SKILL AND CONTRIBUTION — *650*

UPDATE EACH PLAYER'S ROUND WIN SKILL BASED ON THE GENERATED PRE-ROUND OUTCOME PREDICTION AND ROUND RESULTS DATA — *660*

DYNAMIC EVENT-BASED RANKING METHODS AND SYSTEMS

PRIORITY

This application is a continuation of U.S. application Ser. No. 17/223,720, filed on Apr. 6, 2021, which claims the benefit of and priority to U.S. Provisional Application No. 63/006,332, filed Apr. 7, 2020, which is incorporated in its entirety herein.

FIELD

The present disclosure technically relates to ranking within computer-based games. More particularly, the present disclosure technically relates to dynamically ranking within a game based on identified events.

BACKGROUND

Methods for ranking players and their relative skill within games have been utilized for decades. Previous methods of ranking players include the ELO ranking system developed by Aprad Elo as a means for evaluating relative skill levels between chess players. New players can be given a base ranking which can be adjusted up or down in response to winning or losing games until a relative stable ranking is achieved. Ranking was seen as desirable for chess players as they became invested within the sport in order to raise their ranking and could thus face similarly skilled opponents. Methods of ranking players in this way continue to be used within the chess community and eventually migrated into other types of games.

As video games matured and created networked connections between players, the ability to rank the relative skill of a player became useful in determining how to effectively match players in online competition games. Utilizing online rankings for players provided enhanced customer enjoyment as the chances of being matched with a very weak or strong opponent were reduced, creating a moderate and satisfying challenge. Further methods to track player rankings with more accuracy were developed such as the Glicko rating system and the Trueskill™ ranking system from Microsoft Corporation of Redmond, Washington.

However, these traditional scoring systems have limitations. For example, certain ranking methods are limited to one versus one competition games, like chess. As video games and the Internet continued to grow, multiplayer games became possible which created the need to rank teams of multiple players against other teams. Some matching processes attempted to accomplish this by simply summing the individual rankings of the players within a team to create an overall team ranking. The ranking of the players within each team were updated at the conclusion of a match solely based on if the team had won or lost that match.

Traditional ranking methods are further limited in modern games as these games have grown more complex. This complexity has created more opportunities for players within a team to change the outcome of a game based on certain, specific events that can occur. For example, traditional ranking methods would apply an adjustment factor to the rank all players of a winning team equally, no matter if one member of the team contributed far more than another player, who failed to play at all during the game. This perceived disparity in receiving ranking rewards can lead to a sense of unfairness within a game's player base, leading to dissatisfaction. There are a large number of events within modern games that can reflect the true skill level of a player and provide them with a more accurate ranking within a shorter amount of time.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
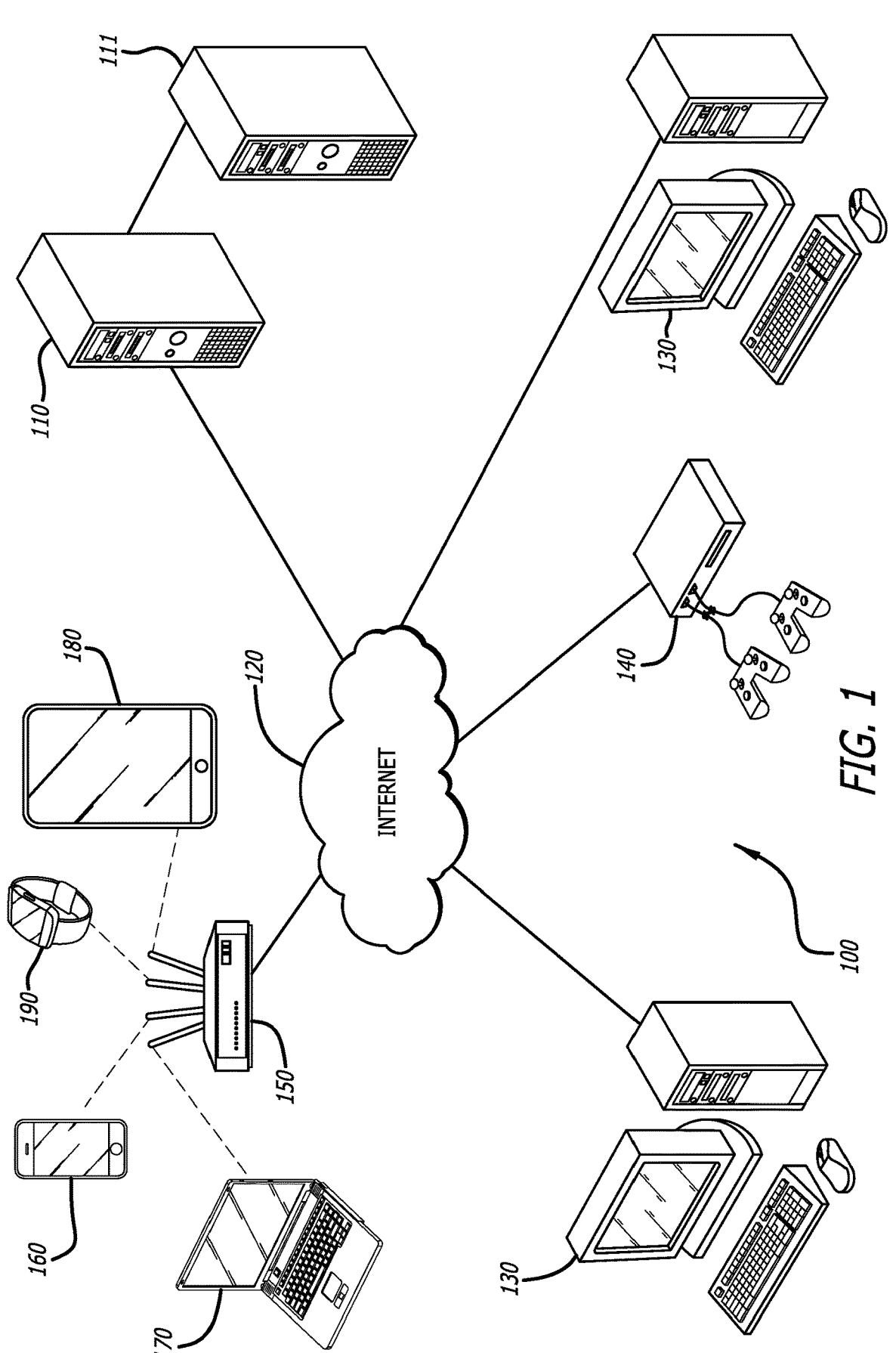
FIG. 1 depicts a system diagram of the dynamic event-based ranking system in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, there is a need to develop a dynamic events-based ranking system that can develop player rankings and skill scores at a more granular level in less time. Described herein are embodiments that utilize one or more methods and systems to identify events within a video game, gather event data, parse the event data to determine individual player outcomes and contributions, and generate a series of sub-scores related to different events within the video game that can be utilized to determine an overall player skill score that can more accurately reflect a player's true skill/rank level in a shorter number of games.

As will be discussed in more detail below, modern video games can be partitioned into discrete events, wherein many games have a large number of repeatable events of similar characteristics. The dynamic events-based ranking system can monitor a game or receive in-game indicators that specific events are taking place. Data related to these events can be recorded, transmitted, and/or parsed such that each player that participated in the event can be identified and their contribution to the outcome of the event can be calculated and/or assigned based on external attributes or variables. Examples of events as described herein can include "encounters" and "rounds." A video game may be partitioned for the sake of event categorization into a plurality of rounds which are typically respective to a pre-determined length or objective. In a number of embodiments, encounters are engagements between one or more players and any number of opponents. In many embodiments, encounters typically happen randomly or at least without any pre-determined regularity. In some games, encounters can occur within rounds within the game. In this way, certain embodiments of the dynamic events-based ranking system and methods, as disclosed herein, may recursively evaluate the rounds within a game, and then the encounters within the rounds to generate an overall player skill score and ranking. The generation of more granular and accurate individual player scores and rankings can subsequently be used to generate more accurate and granular team rankings and scores.

As described herein, the various components and logics utilized within the dynamic events-based ranking systems and methods can allow for the complex granular scoring and rankings of players during and directly after the conclusion of a game. As modern video games become more complex, and the potential types of events and data to monitor grows, it is becoming more difficult to manually monitor, decode, and score the calculations on a satisfactory time interval before most players would want to enter the next match making lobby to play a subsequent game. The sheer number of events, while becoming more difficult to detect and calculate, can also provide an increased number of opportunities to fine tune and adjust each aspect of a player's overall skill score, allowing for new players to jump up to an accurate skill level and ranking with fewer games being played compared to traditional methods. In fact, depending on the configuration of the video game, the dynamic events-based ranking system can achieve a more accurate skill level score ranking in less than half the time compared to traditional ranking methods.

The description herein is not to be taken in a limiting sense but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the following description, certain terminology is used to describe features of the invention. For example, in certain situations, both terms "logic" and "engine" are representative of hardware, firmware and/or software that is configured to perform one or more functions. As hardware, logic (or engines) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "processing" may include launching an application wherein launching should be interpreted as placing the mobile application in an open state and performing simulations of actions typical of human interactions with the mobile application. For example, the application, LEAGUE OF LEGENDS®, may be processed such that the application is opened and actions such as user authentication, selecting to view a profile, scrolling through a game lobby, and selecting and a game to play are performed.

The term "application" should be construed as a logic, software, or electronically executable instructions comprising a module, the mobile application being downloadable and installable on a network device. An application may be a software application that is specifically designed to run on an operating system for a network device. Additionally, an application may provide a graphical user interface (GUI) for the user of the network device.

The term "network device" should be construed as any electronic device with the capability of connecting to a network, downloading and installing applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," "game device," and "mobile device" will be used interchangeably. The terms "mobile application" and "application" should be interpreted as logic, software or other electronically executable instructions developed to run specifically on a network device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Referring to FIG. 1, a system diagram of a dynamic event-based ranking system 100 in accordance with an embodiment of the invention is shown. The dynamic event-based ranking system 100 comprises a plurality of devices that are configured to transmit and receive data related to games, game players, events within the game, game statistics, audio/visual assets, and other game-associated data. In many embodiments, dynamic event-based ranking servers 110 are connected to a network 120 such as, for example, the Internet. Dynamic event-based ranking servers 110 are configured to transmit a variety of data across the network 120 to any number of computing devices such as, but not limited to, personal computers 130, video game consoles 140, and mobile computing devices including laptop computers 170, cellular phones 160, portable tablet computers 180 and wearable computing devices 190. In additional embodiments, dynamic event-based ranking data may be mirrored in additional cloud-based service provider servers or edge network systems 111. In still additional embodiments, the dynamic event-based ranking servers 110 can be hosted as virtual servers within a cloud-based service.

In further embodiments, the sending and receiving of dynamic event-based ranking system data can occur over the network 120 through wired and/or wireless connections. In the embodiment depicted in FIG. 1, the mobile computing devices 160, 170, 180, 190 are connected wirelessly to the network 120 via a wireless network access point 150. It should be understood by those skilled in the art that the types of wired and/or wireless connections between devices on the dynamic event-based ranking system 100 can be comprised of any combination of devices and connections as needed.

In various embodiments, the dynamic event-based ranking system 100 may broadly process game and/or event data from players via any number of personal computers 130, video game consoles 140, and/or mobile computing devices 160, 170, 180, 190 based on the game type desired. Each game played by a player on a network device can often generate a plurality of data related to events that occur within the game which can then be transferred back to the dynamic event-based ranking servers 110 and/or other edge network systems 111. In further embodiments, some or all of the processing of events is accomplished on the network device. In these cases, partial event data, or results/ranking data may be transmitted over the network 120 to the dynamic event-based ranking servers 110 and/or other edge network systems 111

In many embodiments, the event data may be stripped of personal identifying data and transmitted to the dynamic event-based ranking servers 110 and/or other cloud-based services for processing. In this way, the transmitted data may include a unique identification number which is only known by the game provider or accessible on the dynamic event-based ranking servers 110. In this way, attempts to modify, snoop, and/or predict upcoming rankings can be mitigated.

Figure 2:
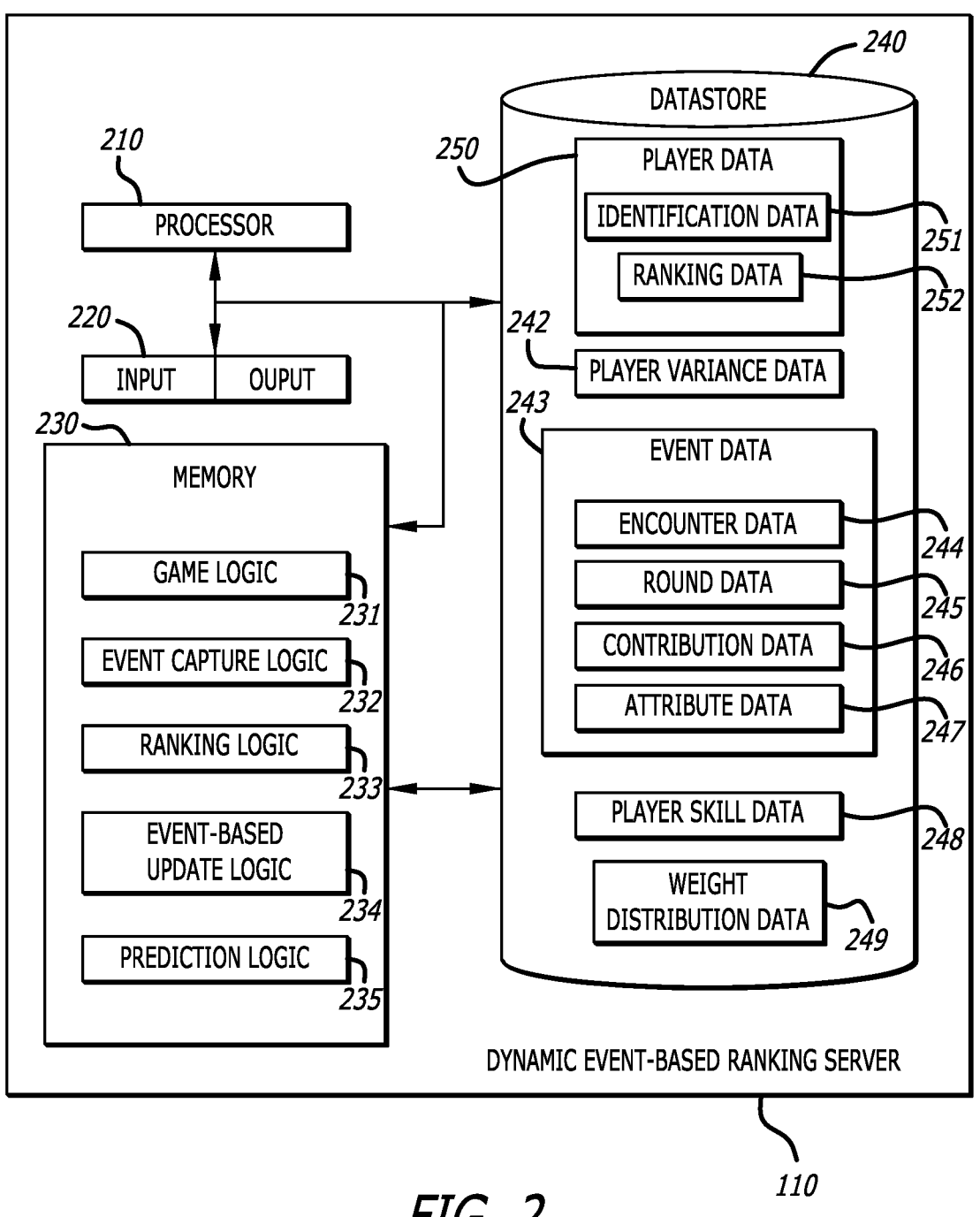
FIG. 2 depicts an exemplary hardware block diagram of a dynamic event-based ranking server in accordance with an embodiment of the invention.

Referring to FIG. 2, an exemplary hardware block diagram of a dynamic event-based ranking server 110 in accordance with an embodiment of the invention is shown. A dynamic event-based ranking server 110 may be any network or computing device that can accomplish a dynamic event-based ranking process. These computing devices may include personal computers 130, video game consoles 140, and/or mobile computing devices 160, 170, 180, 190 as described in FIG. 1 or may comprise any computing device sufficient to receive, transmit, and respond to event data from players. In many embodiments the dynamic event-based ranking server 110 can comprise at least a processor 210, memory 230, input and output devices 220, and a data store 240. The memory 230 can include game logic 231, event capture logic 232, ranking logic 233, event-based update logic 234, and prediction logic 235. The data store 240 may include player data 250 comprising identification data 251, and ranking data 252, event data 243 comprising encounter data 244, win offset or round data 245, contribution data 246, and attribute data 247, player skill data 248 and weight distribution data 249.

In a variety of embodiments, the dynamic event-based ranking server 110 may operate as a component of a video game. In this way, the composition of the memory 230 and datastore 240 can include additional logics and data that further support the playing of the video game and/or supporting applications. It is contemplated that the operations of the dynamic event-based ranking server 110 can be processed by a specialized application within a larger program or by a network device separate from the game logic 231. In fact, multiple embodiments of the dynamic event-based ranking server 110 can comprise many logics and data that are combined and/or separated as needed based on the desired application.

In many embodiments, game logic 231 can be configured to facilitate the playing a video game. The game logic 231 can process and execute a majority of the game code within the dynamic event-based ranking server 110 which can then be transmitted over a network to a player's computing device. In other embodiments, the game logic 231 can function as an intermediary and/or host for multiple player computing devices across a network. In some embodiments, the dynamic event-based ranking server 110 may not comprise any game logic 231 and communicates with other network devices that include game logic 231.

Further embodiments of game logic 231 may also include the ability to generate and/or facilitate matchmaking operations for multiple players. In this way, the game logic 231 may identify and utilize the ranking data 252 of each player and determine optimal multiplayer match settings based on the player inputs received. As those skilled in the art may recognize, optimal matchmaking generally involves selecting opposing players and/or teams that have similar skill/ranking levels in order to facilitate matches that have an even chance of going to either player/team.

In additional embodiments, event capture logic 232 can be configured to examine the data contents of an in-progress game and extract event data 243 as needed. As discussed in more detail with respect to the embodiment depicted in FIG. 4, players and/or game administrators may desire to capture various events that occur during the progression of a game between the start and end of each particular game. Instead of capturing and analyzing the entirety of the game, event capture logic 232 can be configured to search for, extract and/or generate event data that directly relates to a portion of the in-progress game between the start and end points. By way of example and not limitation, events can be a direct encounter between two players within a first-person shooting style game, or may be a "round" or other demarcated portion of the game such as innings in baseball games or capture the flag in team battle games.

Each event can be processed by the event capture logic 232 to produce a set of event data 243 that may later be processed to facilitate an update in each player's skill scores and/or rankings. The format of event data 243 and what parameters within the game constitute an event for the event capture logic 232 to process can greatly vary by desired application. For example, encounter data 244 may be generated based off of a pre-defined window of time while two players interact. In other embodiments, the encounter data 244 may only be generated once a player is killed with subsequent data generated by backtracking through an event buffer within the game logic 231. The backtracking may occur until a specified time limit is reached or when an initial condition is present (such as one player receiving damage from another player).

In certain embodiments, the event capture logic 232 may instead be located on a player's computing device which is configured to examine the game as it happens on said device and transfer the event data 243 to the dynamic event-based ranking server 110 for further processing. In many embodiments, in order to circumvent cheating or other unauthorized data access and/or tampering, the event capture logic 232 and subsequent event data 243 are generated and stored entirely on a remote server such as the dynamic event-based ranking server 110.

In further embodiments, ranking logic 233 facilitates the processing and generation of ranking data 252 which can then be associated with various player's player data 250. Often, the ranking logic 233 is tasked with generating a match making ranking ("MMR") for a player based on one or more player skill scores. Once generated, the ranking data 252 is not typically updated or adjusted by the dynamic event-based ranking server until the conclusion of a subsequent game. However, certain implementations can add a "decay" factor which may lead to a decrease in one or more skill scores that is utilized by the ranking data 252. In certain embodiments, decay can be based on how long it has been since the player associated with the ranking data 252 has played the current game and/or mode. In this way, the ranking logic 233 may be called prior to the matchmaking of a game to determine a more accurate match making ranking based on the player's skill score and decay. It is contemplated that the ranking logic 233 can be configured to generate and process data associated with any of a number of ranking algorithms. An example of a ranking process achieved by the ranking logic 233 is depicted in more detail in FIG. 3.

In more embodiments, event-based update logic 234 may facilitate the process of updating one of a plurality of player scores based on event data 243 captured during gameplay. As discussed in more detail in the descriptions of FIGS. 5-6, the event-based update logic can generate a plurality of scores/rankings for players that can be utilized for generating player skill data 248 which may include a player skill score. As discussed in more detail in the description of FIG. 7, a player skill score can be comprised of one or more sub skills that can be associated with a plurality of events that occur within a game. Either during or after each game, the event-based update logic 234 can utilize event data 243 to generate an updated score for each sub skill or attribute.

In still more embodiments, prediction logic 235 can provide methods of generating predictions of outcomes within a game. Prediction logic 235 may generate traditional predictions of overall wins and losses within each game. This can be accomplished by analyzing the overall rank of each player/team along with, in some embodiments, their respective win/loss records. Once generated, predictions from the prediction logic 235 can be utilized by event-based update logic 234, ranking logic 233, and/or other logics as needed.

When processing event data 243 during the event-based update process, predictions are generated, specifically predictions of event outcomes. In many embodiments, the event data 243 is captured after the event occurs within the game, but the process to update the score requires a prediction of the event outcome as if it occurred prior to the event occurring. As can be understood, because events and associated event data 243 may often not be recognized or available until after the event has occurred, the prediction logic 235 can process data such that a prediction is generated based on game states, data, rankings, and/or scores as they were prior to the event occurring. In this way, the event-based update logic 234 can utilize these predictions to examine and generate a difference between the prediction and the actual outcomes of the events. This difference can then be utilized to update various scores/rankings within the player skill data 248 for each player within the game.

In some embodiments, player data 250 relates to any data associated with a specific player from the pool of all stored and/or present players available within a game. Player data 250 may further include identification data 251 and ranking data 252. Identification data 251 can be identifying information such as name, user handle, customer identification number, birthdate, location, contacts, etc. Typically, identification data 251 can be utilized to separate and identify one player apart from each other player but may also include further data as needed based on the application desired.

Ranking data 252 may include data related to ranking such as match-making ranking ("MMR"), overall win/loss records, hidden ranking data, and/or individual rankings within various game modes and game activity positions. In some embodiments, ranking data 252 can be included within identification data 251 and may be stored separately from the player data 250 in certain embodiments to circumvent cheating.

In various embodiments, player variance data 242 can be utilized to adjust the overall confidence of the system's scores/rankings. Player variance data 242 can comprise an overall variance that can be utilized as a factor in subsequent processing of player skill and/or ranking data updates. Variance is utilized by the system to determine an amount of change that may occur to a player's scores and/or rankings as a result of an event/game. A higher variance allows for greater changes to a score and/or ranking while lower variances provide for less score/ranking movement in response to a win or loss. Traditionally, a ranking system will assign a higher variance to a player when the overall confidence of that player's skill score and/or ranking is low. Often, this assignment of a higher variance done for players who have not played many games. As players complete more games, the confidence of the generated skill scores and/or rankings of the player increases, thus leading to a lower associated variance. Variance can also be higher when players have not played the game in a pre-determined amount of time. This is known as "decay."

It is contemplated that certain embodiments may adjust the player variance data 242 under acute situations such as a player having played for many hours in a row, the detection of events and/or data that indicate the player is experiencing extreme negative emotions, or when event data 243 indicates that the player is on a prolonged winning and/or losing streak within a particular game.

In yet more embodiments, event data 243 is captured by the event capture logic 232 within a game. Event data 243 may further include encounter data 244, round data 245, contribution data 246, and/or attribute data 247. However, it is contemplated that event data 243 may include any subset of data that can be associated with an event and/or attribute within a game and processed to update the overall player skill data 248 to more accurately reflect a player's true skill score/ranking.

Encounter data 244 may include data associated with a specific encounter that occurred with a game. In a number of embodiments, this can include an engagement between two players within an online game. Often, during an online game, players can engage with each other until one is victorious and the other is not, and instead of ending the game, the players are able to keep playing until another event occurs to end the full game.

By way of example and not limitation, an online game may include multiple players in a team battling game. Each player is free to run about a specified map terrain and can attack players from the other team. Once engaged, two or more players can attack each other until one has been killed, leaving the other player victorious and able to move onward, while the killed player is often put back to a starting position. In certain embodiments, once a player has been killed, the event capture logic 232 can look back through the buffer to gather encounter data 244 related to the death of the player. Encounter data 244 can include classifications on what players were on which sides of the encounter, what players won or lost the encounter, what player dealt the most damage to the dead player, players who assisted with the encounter victory, players who achieved game objectives. It is contemplated that other data related to encounters can be recorded within the encounter data 244.

In many embodiments, round data 245 can be similar to encounter data 244. However, while encounter data 244 often comprises data related to various encounters that occur randomly during the game, round data 245 is often associated with pre-determined demarcated portions of a game. For example, a simulation baseball video game can collect round data 245 associated with each inning within the game. Baseball innings are pre-known spans of events that can be captured with different rules than encounter data 244. As can be recognized by those skilled in the art, round data 245 can be configured to encompass any of a variety of portions of a game.

Another type of event data 243 useful for dynamically generating rankings based on events is contribution data 246. As many game players recognize, various portions and events within the game can be more greatly affected, both positively and negatively, by particular players or members of a team. For example, within a team fighting game, one player from a first team may be attacked and killed by multiple players from a second team. During the attack, a first player from the winning team is responsible for ninety percent of the damage done to the other team, while a second player only contributes ten percent to the total damage done. Under traditional ranking methods, each member of the winning team would be rewarded equally and would (if they had similar rankings and variances) experience the same ranking/score bump. Many players experience outcomes like this and perceive them as unfair. Thus, the event capture logic 232 may capture contribution data 246 which can be utilized in the calculation and update of player scores. It is contemplated that contribution data 246 may reflect any sort of data that can be associated with contribution by a player. This may include, but is not limited to damage dealt, assist given, objective achieved, items used, items given, player character type and/or attacks used.

Utilizing the example given above, the event capture logic 232 may determine that the first player delivered ninety percent of the damage, meaning they were ninety percent responsible for the win, while the second player was ten percent responsible. Thereafter, as is described in more detail within the discussion of FIG. 5, the subsequent prediction calculations may utilize the contribution data 246 to generate a more accurate prediction of the encounter outcome. Thus, the updating of the winning player's rankings and/or skill scores can more accurately reflect the actual outcome of the encounter. It is contemplated that contribution data 246 can be configured to track and/or utilize a wide variety of game states and data including, but not limited to, currently equipped enhancements ("buffs") and de-enhancements ("debuffs"), being alive/active during the beginning time point of the encounter, and/or ideation of the encounter beginning based on available visual/display data.

A further type of data that can be stored within event data 243 is general attribute data 247. In many embodiments, attribute data 247 may be a catch-all for data regarding events that may be desired for future calculations. Attribute data 247 may include, but is not limited to, data relating to what map was the game played on, what character class was the player, what network conditions during the game were like, where certain events occurred within the game map, when certain events occurred within the game, and/or which players exhibited concerning or questionable actions (such as being away from the game, having an automated (bot) player playing, reward farming related actions, or cheating actions). It is contemplated that any type of attribute within a game that may be desirable to access later for purposes of score/ranking accessing and validation may be stored within the attribute data 247.

In a number of embodiments, player skill data 248 comprises a player skill score that can be configured to represent a player's overall skill within a particular game. As certain games may have multiple modes, character types, and positions to play, various embodiments include multiple player skill scores for each of these different variations on the game. As shown in more detail within the discussion for FIG. 7, a player skill score can be comprised of a number of attributes and sub-scores that are associated with various event types within the game. By way of example and not limitation, a baseball simulation video game may generate player skill scores for each player based on what position they play, how many innings were won (earned more runs than gave away), what team they played, and/or what combination of players interacted with each other. Similarly, an example player skill score for a team combat game may be generated based on event data 243 related to the number of encounters the player had, the number of rounds were won during the game (such as how many times a flag was captured, etc.), how much damage was given compared to how much was received, the player's history with the character used and the map played on. The player skill data 248 may be utilized by the ranking logic 233 to determine an appropriate rank and/or the game logic 231 to select a fairer match.

In still additional embodiments, weight distribution data 249 can be utilized within the generation and updating of player skill scores to emphasize and/or deemphasize which events accurately reflect a proper player skill score. By way of example and not limitation, if a player skill score is generated by utilizing the number of encounters won, and the number of rounds won compared to their encounter performance estimation, and the game administrators believed that the skill factor calculated from the number of encounters won accounts for twenty percent of the player's overall skill while the skill factor calculated from a predicted/real number of rounds won based on their encounter accounts for eighty percent of the player's skill, weight distribution data 249 can be utilized to express these differences. As shown in more detail in the discussion of FIG. 8, the player skill score can be comprised of a plurality of sums of products that are themselves comprised of the various event data scores and the associated weight. It is contemplated that, in some aspects, the various weights within the weight distribution data 249 may be changed, and/or adjusted via updates, or dynamically over time from an algorithm.

Further referring to FIG. 2 generally, the dynamic event-based ranking server 110 can include computing machine-readable media. The computing machine-readable media can be any available media that can be accessed by the dynamic event-based ranking system 100 and includes both volatile and non-volatile media, along with removable and non-removable media. By way of example and not limitation, computing machine-readable media includes storage of information, such as computer-readable instructions, data structures, other executable software or other data. The computing machine-readable media includes, but is not limited to, RAM, ROM, EEPROM, flash memory or other memory technology, CD-ROM, digital versatile disks (DVD), Blu-Ray discs (BD), or other optical disk storage, magnetic cassettes, magnetic tape, magnetic disk storage or other magnetic storage devices, or any other tangible medium that can be used to store the desired information and that can be accessed by the dynamic event-based ranking server 110. Transitory media such as wireless channels are not included in the computing machine-readable media. Communication media typically embody computer-readable instructions, data structures, other executable software, or other transport mechanisms and include any information delivery media.

A player can enter commands and information into network devices in communication with the dynamic event-based ranking server 110 through input/output devices 220 such as a keyboard, a touchscreen, software or hardware input buttons, a microphone, or a pointing device or scrolling input component such as a mouse, trackball, or touch pad. This input can be done directly on a dynamic event-based ranking server 110 or can be entered gathered from the Internet via other network devices such as, for example, a video game console 140 or personal computer 130.

Figure 3:
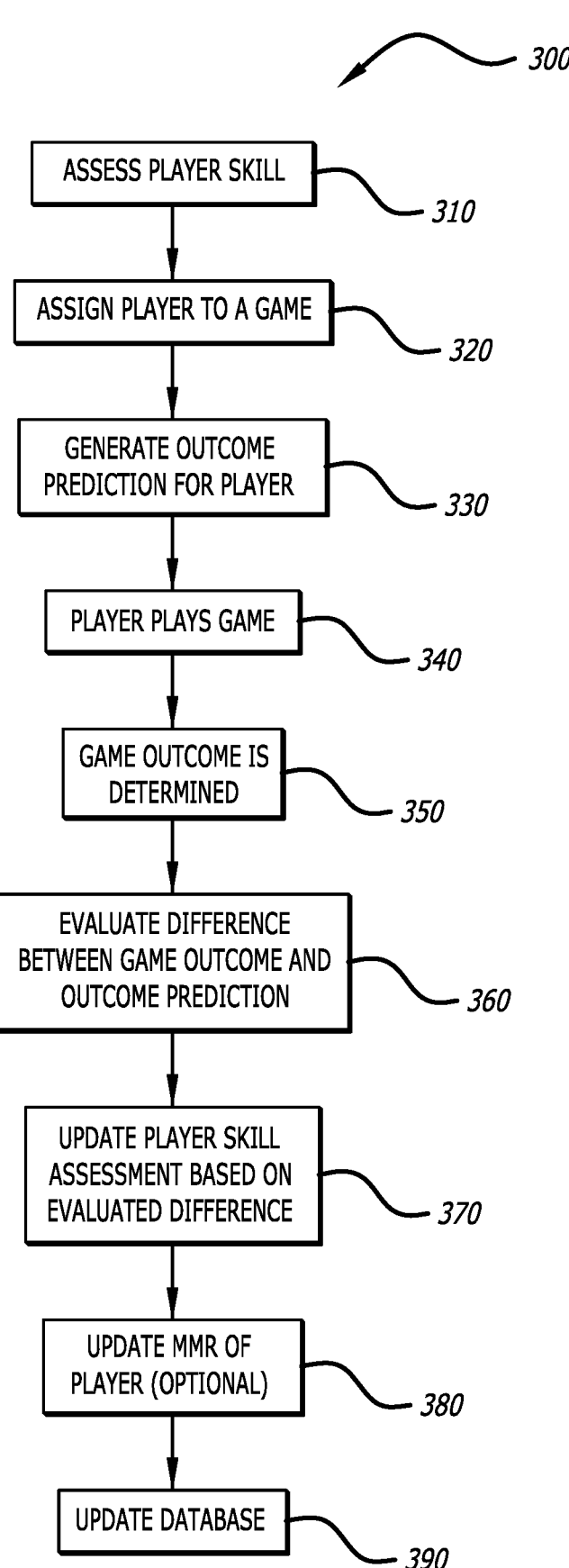
FIG. 3 is a flowchart depicting a traditional process for generating and updating player rankings within a game in accordance with an embodiment of the invention.

Referring to FIG. 3, a flowchart depicting a process 300 for generating and updating player rankings based on events within a game in accordance with an embodiment of the invention is shown. The process 300 is typically utilized for updating scores and ranking players after a game is completed. Prior to starting a new game, the process 300 may assess player one's skill prior to playing (block 310). This may occur in situations where a player has never played the game before (new player) or has not played the game in a long time (and may suffer from decay). In certain embodiments, the assessment may be accessing a player's skill level from a datastore.

The process 300 may then assign a player to a game, typically based on their skill (block 320). In many embodiments, this assignment may be for a multi-player and/or multi-team matchmaking session. In other embodiments, the assignment may be for a single player game and the skill is assessed in order to determine the level of difficulty the game will provide. Typically, the process of assigning a player will involve processing their skill and/or ranking. Often, skill levels and rankings of opponents of the player are also available. The process 300 may utilize the players and opponents' relative skills and/or rankings to generate an outcome prediction for the player (block 330). In a number of embodiments, the outcome prediction can take the form of a numerical representation of the probability of success for the player.

The player then plays the game against the selected opponents (block 340). As a result of playing the game, an end state is reached, and the game outcome is determined (block 350). Typically, the game outcome is provided as either a win or a loss. The process 300 may then evaluate the difference between the game outcome and the previously generated outcome prediction (block 360). In some embodiments, the difference may be evaluated as a numerical difference between the probability of winning and the actual result.

Once the difference in expected and actual outcomes has been evaluated, the process 300 can update the player's skill assessment (block 370). This typically includes increasing the player's skill assessment score when they win and lowering it when they lose. The amount of movement in the score updating can be affected by a few factors including an associated variance which may indicate the overall confidence of the score. Players with higher variances can have their skill scores adjusted in greater margins compared to players with lower variance factors. Additionally, the skill assessment of the opponent may also affect the amount of change in the player's skill score during the process 300. By way of example and not limitation, the player may have faced an opponent with a much higher skill score. In this case, when faced with a loss, the player's skill score will move down relatively less than if they faced a lower skilled opponent. Likewise, if the player in this example won against the highly skilled player, the player's assessed skill score would be adjusted much higher than if the opponent's skill score was equal or less than the player's score.

In a variety of embodiments, an additional match making ranking ("MMR") may be updated based on the results of the game (block 380). Similar to assessing the player's skill score, the greater the rank of the opponent, the greater the increase in rank will be for the player in response to a win. Once all of the player's skills and rankings have been assessed and updated in response to the completed game, the process 300 updates the database such that the player's data now reflects the newly earned score and/or rankings (block 390).

Figure 4:
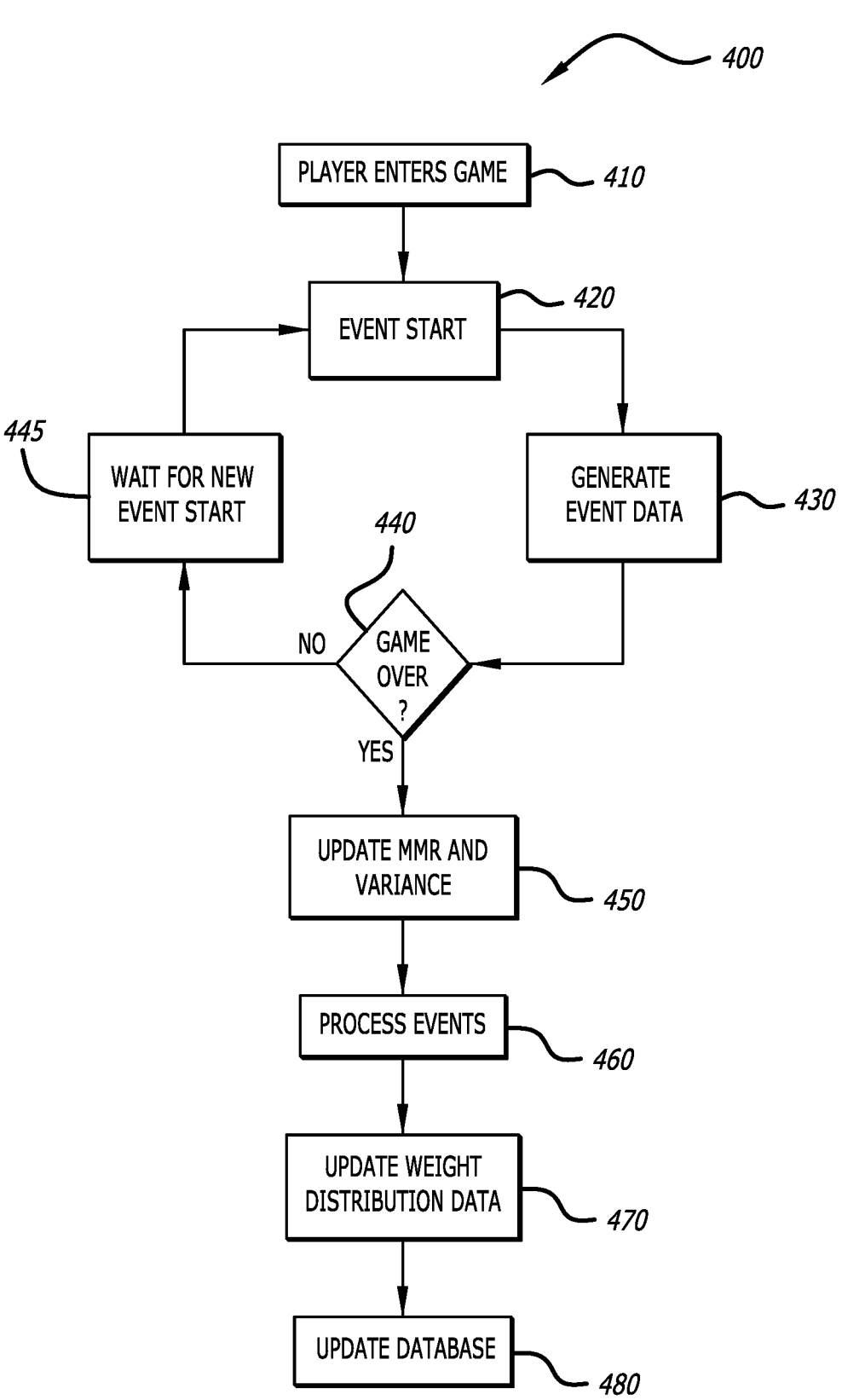
FIG. 4 is a flowchart depicting a process for generating and updating player rankings based on events within a game in accordance with an embodiment of the invention.

Referring to FIG. 4, a flowchart depicting a process 400 for generating and updating player rankings based on events within a game in accordance with an embodiment of the invention is shown. As discussed above, embodiments of the invention can capture and utilize event data within a game in order to more efficiently generate a suitable score/ranking. The updated process 400 begins when a player enters a game (block 410).

Once inside the game, the process 400 can begin an event data capture loop until the game ends. The listening loop begins once an event has been started (block 420). During and after the event, the process 400 generates event data (block 430). In some embodiments, the game itself can generate and output the event data. In additional embodiments, other logic (such as the event capture logic 232 as described in FIG. 2) can operate within the game or host computing device and capture the event data for further use. Once the event is completed, the process 400 can determine if the game has finished (block 440). When the game has not yet completed, the process 400 can simply enter a listening state and wait for a new event to start (block 445). This process can repeat itself numerous times during the course of a single game.

Once the game has ended, process 400 may then do a standard update of the MMR and player variance (if needed), similar to the process as described in FIG. 3 (block 450). The process may also process the events to update a player's overall skill score (block 460). The process of processing event data for evaluating player skill scores is described in more detail in the discussion of FIGS. 5-6. It is contemplated that processing and updating of MMR, player variance and events can be done in parallel or in opposing order as there is no direct sequential basis for the processes done for each step in most embodiments.

In certain embodiments, the process 400 may want to update weight distributions based on the results of the game or from an update or other pre-determined factor (block 470). For example, the weights utilized within the processing of event data to determine a player's skill score may change over time based on the events processed. Analysis by game administrators may indicate that one event type may be more crucial during the first few games a player plays but may shift or be less consequential as the number of games completed increases. Once the MMR, variance, event data, player skill scores, and weight distributions have all been updated, they can be written into the database (block 480).

Figure 5:
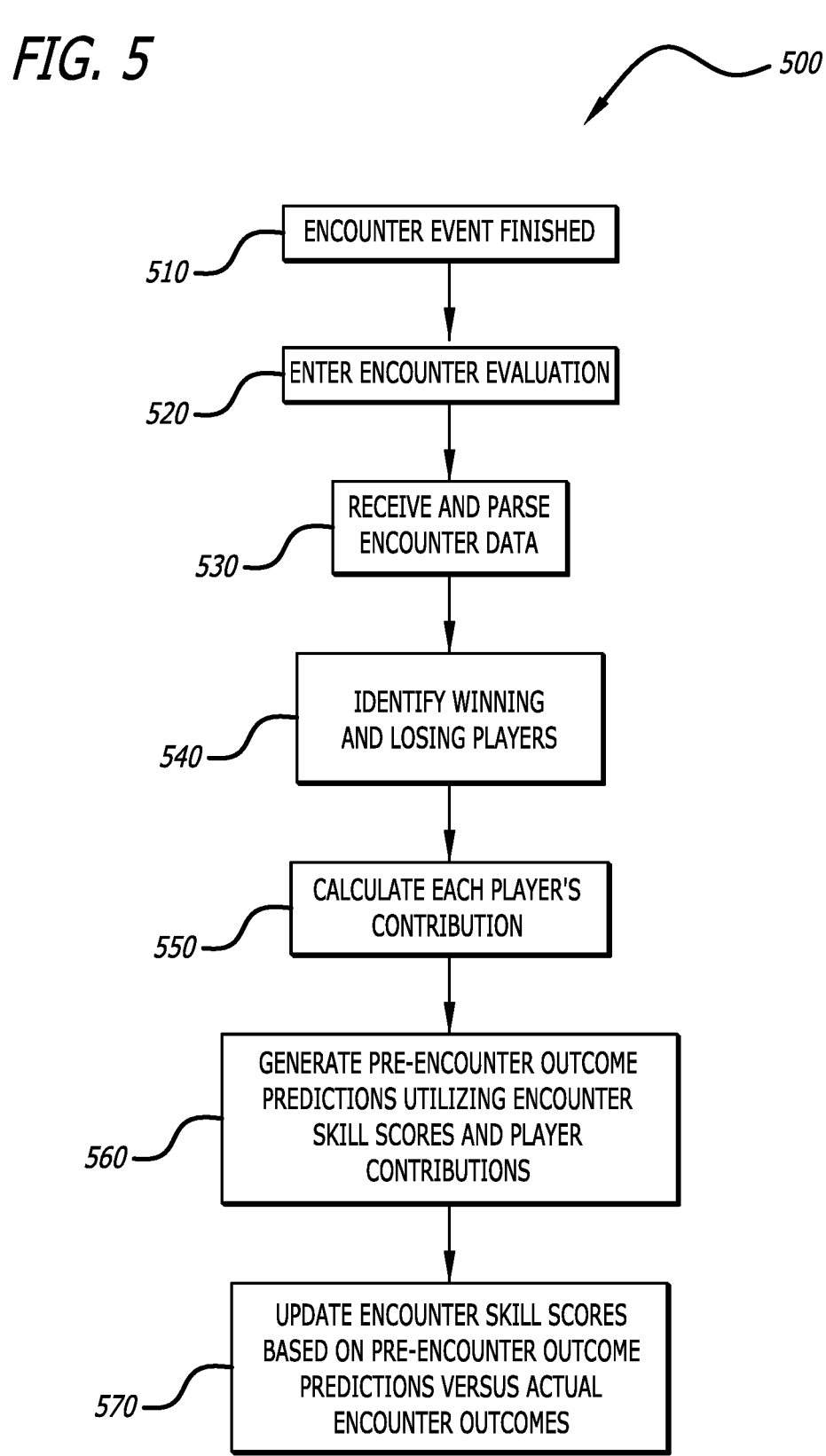
FIG. 5 is a flowchart depicting a process for updating an encounter skill score based on an encounter event type data evaluation in accordance with an embodiment of the invention.

Referring to FIG. 5, a flowchart depicting a process 500 for updating an encounter skill score based on an encounter event type data evaluation in accordance with an embodiment of the invention is shown. As discussed above with reference to FIG. 4, the dynamic event-based ranking system processes events to generate event data that can be utilized to create more granular skill ranking scores for players. While virtually any type of event within a game may be utilized, the embodiment depicted in FIG. 5 shows an "encounter" event type being processed.

Encounter event types can be defined in many embodiments as one or more players engaging in conflict. For example, in a baseball simulation video game, an encounter may be an at bat between a specific hitter and pitcher, while in a team combat video game, an encounter may be classified as one or more players attacking each other (and thus causing damage) until the engaged players either die or disengage. It is contemplated that encounter type events can be classified in a large variety of ways and can be captured either during the actual encounter or at the end of the encounter or game. In the embodiment depicted in FIG. 5, the encounter is processed once the encounter is over, although this does not necessarily have to be the case.

The process 500 of the exemplary embodiment can begin once the encounter event has finished (block 510). This can be defined in a number of ways by the video game developer, as described above. Once the encounter is over, the process 500 can enter the encounter evaluation process (block 520). While the embodiment described here enters the evaluation process directly upon the completion of an encounter event type, it is contemplated that various embodiments may enter the encounter evaluation at a later time, for example, at the conclusion of the game.

The process 500 receives and parses the available encounter data (block 530). The encounter data may be event data that is stored within a datastore such as the datastore 240 depicted in FIG. 2. In other embodiments, the encounter data may be received from a game buffer or from a remote server. Parsing of the encounter data allows the process 500 to identify the winning and losing players from the encounter (block 540). As discussed above, winning team players may be identified in numerous ways including determining which player scored the kill in a team combat video game, which player dealt damage to another player, if any player scored an assist, and/or if a game objective was accomplished by a player during the encounter. Losing players may be identified by determining if a player lost the encounter (was killed or is alive when another teammate was killed in a team battle for example). It is contemplated that a variety of conditions may be utilized to make a determination regarding which players were involved with the encounter and which players are to be considered as winning or losing.

In addition to determining winners and losers within an encounter, the process 500 can calculate each player's contribution to the encounter (block 550). For example, in a team battle video game, two players may attack an opponent player. While the opponent player was killed in the encounter, the first player dealt ninety percent of the damage to the opponent while the second player only dealt 10 percent of the damage to the opponent. The dynamic event-based ranking system can gather contribution data in order to accommodate subsequent skill scores and rankings based on these types of situations. As discussed above, there are multiple ways that contribution data can be collected and parsed to determine player contributions during an encounter. By way of example and not limitation, players may be assessed by determining who scored the killing shot (in a team battle video game), who dealt damage/scored against an opponent, if an assist was made by a player, and if a particular player achieved a team objective during the encounter. However, as discussed with respect to the identification step, calculating player contributions can be done in numerous ways and adjusted as a game developer desires.

The process 500 can then generate a prediction of the encounter based on conditions that occurred before the encounter while also considering player skill scores and actual player contributions (block 560). As discussed above with respect to the prediction logic 235 of FIG. 2, predictions on the outcome of an encounter can be generated even after an encounter has completed. In many embodiments, the prediction can be generated by utilizing the player encounter skill while also factoring in their contribution that was recorded. In this way, the prediction logic can consider that, for example, a team with a professional player is not an overwhelming favorite to win if they only contributed a very small percentage toward the encounter outcome. In this way, even though the game does not pre-determine the number, complexity, or skill of the players involved in any given encounter type event, the prediction generation can reflect a balanced outcome that can be utilized to more properly update the overall player skill scores (block 570). It is contemplated that many video games can generate many encounters very quickly with various amounts of time. This can allow for an increased number of evaluations during a single game, which can, in many embodiments, allow the dynamic event-based ranking system to achieve a more accurate player ranking faster than traditional methods, which would be impossible to do by hand during complex video games.

Figure 6:
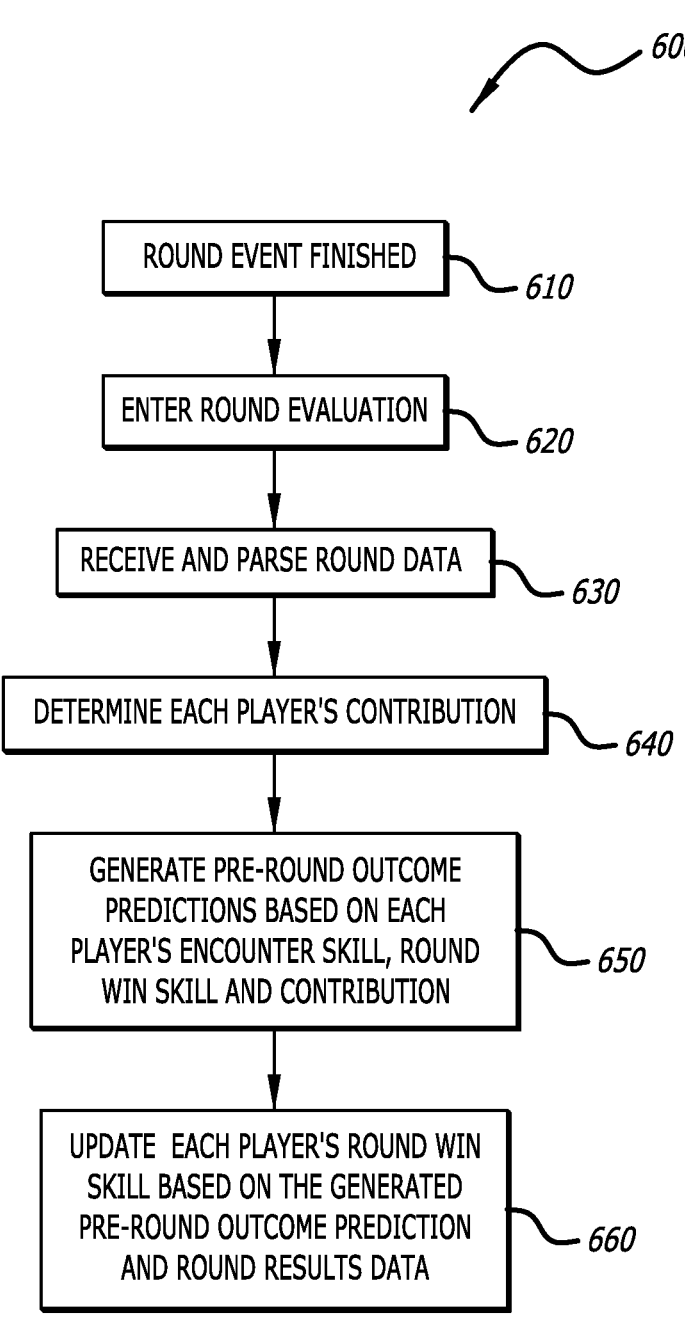
FIG. 6 is a flowchart depicting a process for updating a win skill score based on a round event type data evaluation in accordance with an embodiment of the invention.

Referring to FIG. 6, a flowchart depicting a process 600 for updating a win skill score based on a round event type data evaluation in accordance with an embodiment of the invention is shown. As discussed above, there can be a large variety of event types that can be recorded, parsed, and utilized within a dynamic event-based ranking system. In FIG. 6, an exemplary embodiment is depicted showing the processing a "round" event.

The method for utilizing round event types is similar to that of encounter event types. For example, the process 600 also can begin once a round event is finished (block 610). However, the processing of round event type data can be accomplished after the end of the video game, and not necessarily once the round event immediately ends as in the currently illustrated embodiment. In various embodiments, the round data evaluation occurs after the round event has finished (block 620).

The logic responsible for processing the round event data, such as, for example, the event-based update logic 234 depicted in FIG. 2, can receive and parse the round event data (block 630). As discussed above, a "round" may be defined in any way suitable to a game developer, but in a variety of embodiments may be comprised of a pre-defined or known portion of a game. A portion of a game may include a pre-defined time (such as a quarter period in a basketball simulation video game), or a pre-defined event (capturing a flag in a team battle game).

Once captured, the process 600 can determine each player's contribution to the round (block 640). Similar to determining contribution for encounters, round contributions may include, but is not limited to, evaluating which player scored, was killed, dealt damage, stayed alive, achieved an objective, or scored an assist. It is contemplated that changes to the weights of these various contribution types may be utilized by the game developer based on the desired need.

Pre-round outcome predictions can be generated by the process 600 prior to final evaluation (block 650). The pre-round prediction can utilize factors such as the player's encounter skill, the player's round win skill, and/or the contribution of the player to the overall round. As with the predictions generated with the encounter type data of FIG. 5, by utilizing contribution data, the dynamic event-based ranking system can generate more accurate predictions for rounds that may have outsized influences over the outcome.

In response to generating the pre-round predictions, the process 600 can update each player's round win skill based on the difference between the generated pre-round prediction and the actual outcome results data (block 660). Because the predictions factored in contributions from each player, the resulting updating of skill scores and rankings can converge to a more accurate player skill score with each round. A video game may be configured to provide a large number of rounds throughout the course of a single game which will further decrease the number of completed video games needed for a player to receive an accurate rating.

Figure 7:
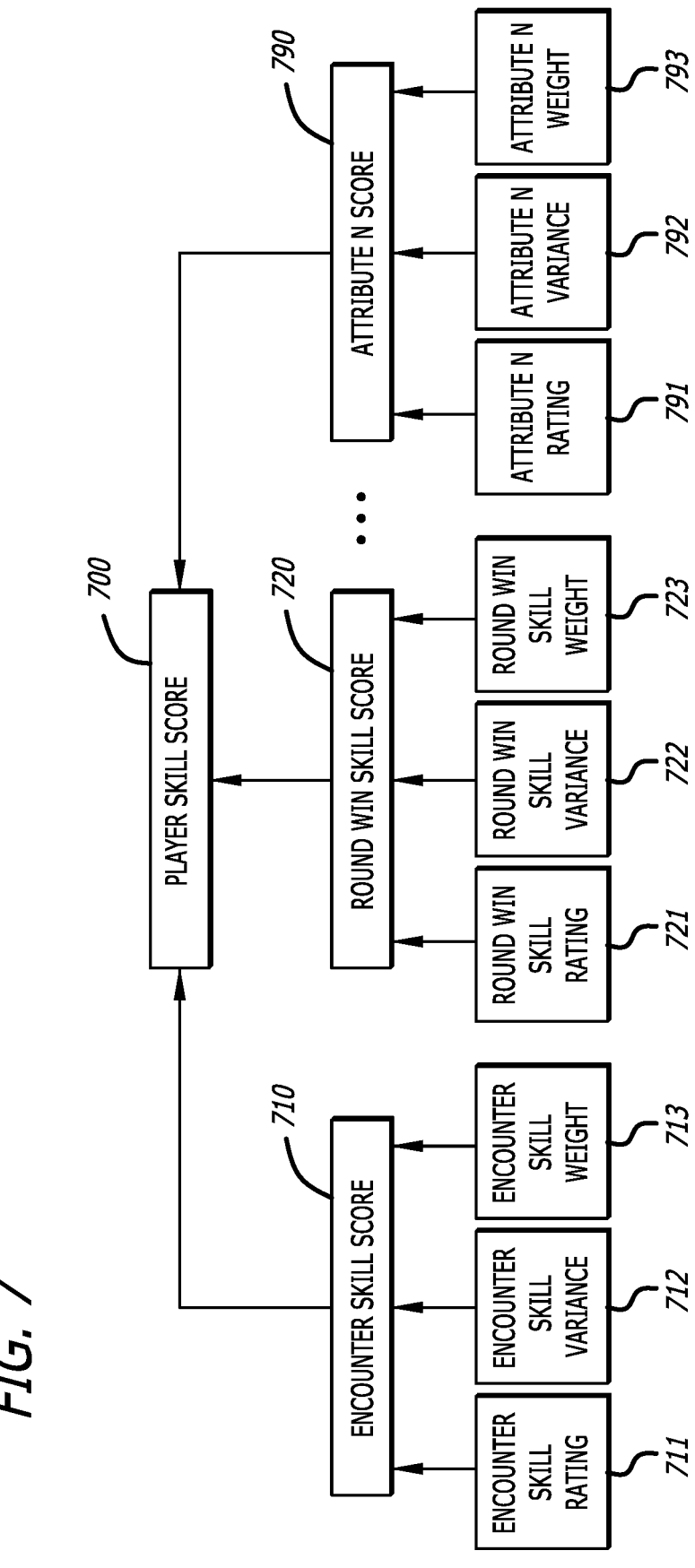
FIG. 7 is a conceptual depiction of a player skill score in accordance with an embodiment of the invention.

Referring to FIG. 7, a conceptual depiction of a player skill score 700 in accordance with an embodiment of the invention is shown. As discussed above, a player's overall skill score 700 can be utilized in order to rank players within matches, or it may be utilized as a means of comparing various players for match making purposes. Traditional methods of generating player skill scores and/or ranks involve utilizing normal distributions over a range of scores, with a variance expressed in terms of one or more standard deviations. Here, in a number of embodiments, the player skill score 700 is comprised of a plurality of sub-scores which may include, but are not limited to, an encounter skill score 710, a round win skill score 720, and any other attributes that may be factored in by the game developer, indicated by attribute N score 790.

Each of the sub-scores 710, 720, 790 are themselves composed of a rating, variance, and weight. For example, the encounter skill score 710 can be generated by utilizing an encounter skill rating 711 that has an associated encounter skill variance 712 that can indicate confidence in the encounter skill rating 711. The encounter skill weight 713 may generally indicate the amount of influence the encounter skill score 710 has over the entire player skill score 700. In many embodiments, this is represented as a percentage.

Similarly, the round win skill score 720 can indicate the player's overall effectiveness at being victorious within a round. Like the encounter skill score 710, the round win skill score 720 includes a round win skill rating 721, a round win skill variance 722, with a round win skill weight 723 which further adjusts the amount of influence the round win skill score 720 has over the entire player skill score 700. Lastly, it is contemplated that other methods of skill scores can be compiled and utilized in determining an effective player skill score 700. As discussed above, other static attributes, represented in the depicted embodiment as attribute N 790 may also affect the overall player skill score 700. The affect on the player may also be described as providing an attribute N rating 791, which has an associated attribute N variance 792, with a modifying attribute N weight 793. Attributes may include, but is not limited to, which video game platform the player gathered their score. For example, a player may earn a first player skill score 700 playing the game on a video game console like the video game console 140 depicted in FIG. 1. Traditionally, it has been considered harder for a player to earn a high player skill score on a home console unit compared to a traditional personal computer like the personal computer 130 depicted in FIG. 1. In this way, if parity was to be achieved across all players on multiple platforms, an attribute score and weight would likely be needed to even out the player skill score 700 and subsequent rankings on multiple platforms.

Figures 8, 9:
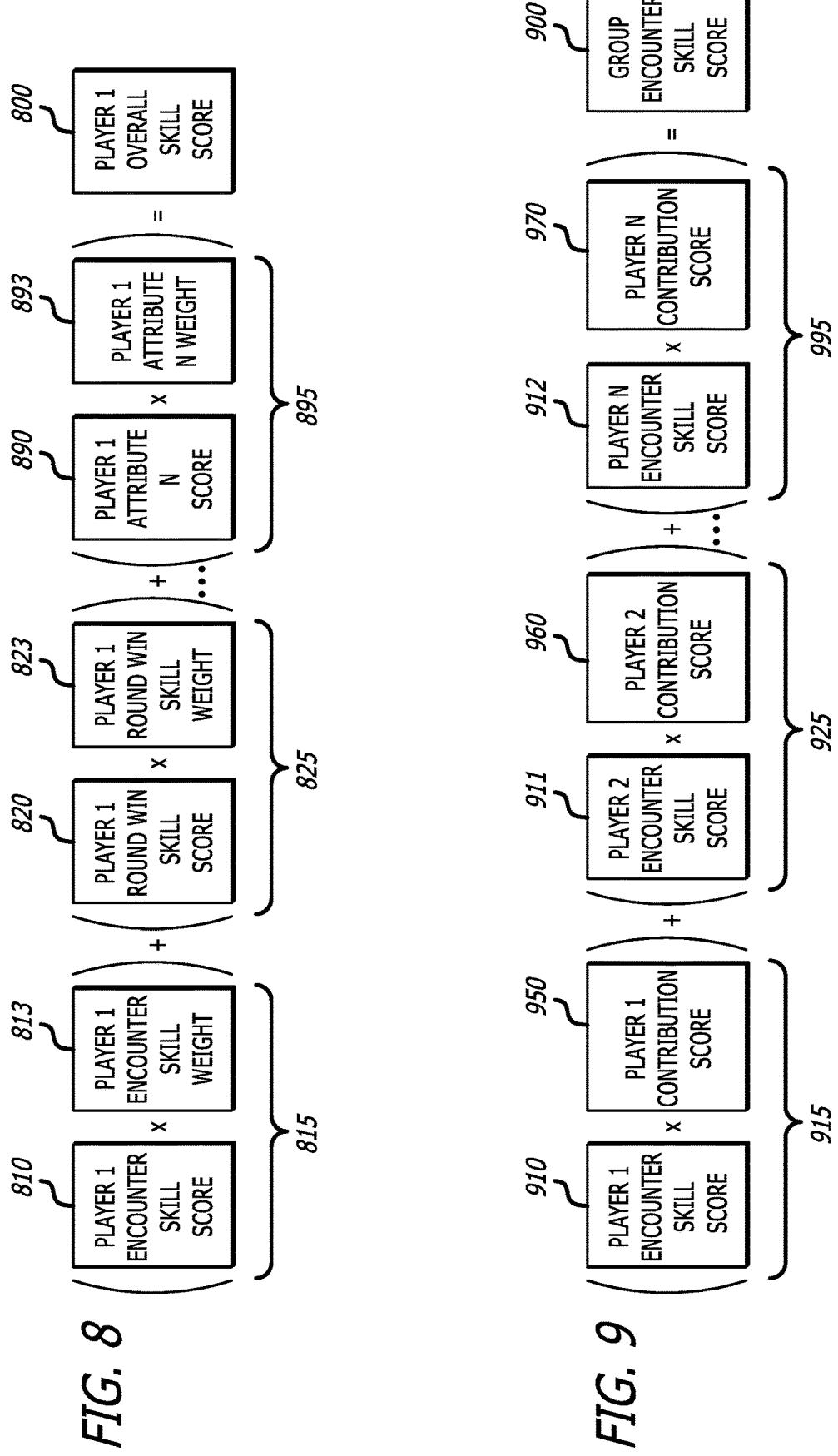
FIG. 8 is a conceptual depiction of the process for generating an overall skill score for a player in accordance with an embodiment of the invention.
FIG. 9 is a conceptual depiction of the process for generating a group encounter skill score for a player in accordance with an embodiment of the invention.

Referring to FIG. 8, a conceptual depiction of the process 800 for generating an overall skill score for a player in accordance with an embodiment of the invention is shown. In order to generate an overall skill score for Player 1 800, the sum of each of the products of the sub-scores 815, 825, 895 must be calculated. In the example depicted in FIG. 8, the first product 815 is comprised of Player 1's encounter skill score 810 and encounter skill weight 813. As discussed above, the encounter skill weight 813 can directly affect how the encounter skill score 810 affects the final Player 1 skill score 800. The higher the weight, the more the Player 1 encounter skill score 810 will affect the final sum and vice versa.

Likewise, the round win skill score of Player 1 820 is utilized in the second product 825 along with the Player 1 round win skill weight 823. In fact, depending on the configuration of the overall player skill score, game developers may adjust the calculations to include any number of products within the sum of the overall skill score. This is represented by the inclusion of the attribute N product 895 that includes the attribute N score for Player 1 890 and the attribute N weight for Player 1 893. In certain embodiments, the weights 813, 823, 893 can be represented as a percentage decimal between 0 and 1. In further embodiments, the sum of all of the weights 813, 823, 893 together equal or do not exceed 1.

Referring to FIG. 9, a conceptual depiction of the process 900 for generating a group encounter skill score for a player in accordance with an embodiment of the invention is shown. As discussed previously, traditional methods of generating skill scores for teams simply summed up the skill score or ranking of each member of a team to generate a summed total team score. Utilizing the dynamic events-based ranking system, team scores can not only be generated, but team sub-scores can also be predicted and generated based on each players contribution and personal sub-score. This allows for a more granular understanding of each players combined scores and rankings which can be utilized to dynamically adjust team matches based on changes or other attributes within a video game, creating more even matchups between teams.

Similar to the generation of an overall skill score as seen in FIG. 8, the generation of, for example, a group encounter skill score 900 can occur by summing the products 915, 925, 995 of each player's respective scores and their derived contributions. In certain embodiments, each player can have an encounter skill score that can be utilized. As depicted in FIG. 9, a Player 1 encounter skill score 910 is multiplied by Player 1's contribution score 950 to create the first product 915. This is summed with the second product 925 which comprises Player 2's encounter skill score 911 and contribution score 960. It is contemplated that a team/group within a video game can be made up of any number of players which is only limited by either game design or computational power. Therefore, any number of players may be summed to generate the group encounter skill score 900. This is represented by the Player N product 995 which comprises a Player N encounter skill score 912 multiplied by the player N contribution score 970.

Contribution scores can be generated in a variety of ways. For example, group contribution scores can often be represented as a percentage decimal between 0 and 1. In these embodiments, the total of all player contribution scores 950, 960, 970 will equal or be less than 1. This contribution scores 950, 960, 970 can be determined based on, for example, the contributions given in the previous game, or window of games. The contribution scores 950, 960, 970 could be determined by each Player's overall player skill score or rank, meaning that a higher-level player is more likely to contribute than a lower-ranked, newer player.

Although the group sub-score depicted in FIG. 9 was a group encounter skill score 900, it is contemplated that group/team skill scores can be generated from any sub-score in a similar manner to the process described with respect to FIG. 9. For example, a group overall round win skill score could be generated by summing the products of each player's individual round win scores with their individual contribution scores. Further group sub-scores could also potentially indicate attribute resilience such as a group's skill in utilizing certain maps, characters, weapons, items, etc.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

The invention claimed is:

1. A device, comprising:
a processor; and
a memory communicatively coupled to the processor, the memory comprising:
a game logic, processed by the processor, configured to:
execute a game with one or more networked-connected player devices;
processing a plurality of events within the executed game prior to the game conclusion, the plurality of events comprising real-time processing of in-game results of controller inputs communicatively coupled to a player device of the one or more networked-connected player devices;
capture event data associated with the plurality of events; and
update player skill data based on the captured event data, wherein the update includes modification of a score using a variance value that is determines a magnitude of score adjustment, wherein the variance value is higher for players with fewer completed games and for players who have not played within a predetermined time threshold, and wherein the variance value affects weighting applied to the captured event data in updating the score.

2. The device of claim 1, wherein the plurality of events comprises two or more event types.

3. The device of claim 2, wherein the two or more event types comprises at least encounter type events and round type events.

4. The device of claim 3, wherein player skill data comprises at least a plurality of player skill scores associated with the plurality of players.

5. The device of claim 4, wherein the player skill data further comprises at least a player encounter skill score associated with a player's past outcomes within an encounter type event.

6. The device of claim 5, wherein the player skill data further comprises at least a player win offset skill score associated with a player's past outcomes within a win offset type event.

7. The device of claim 6, wherein the server further comprises weight-distribution data comprising a plurality of event type weights associated with a numerical contribution of each event type to a player skill score.

8. The device of claim 7, wherein the player skill score can be generated by summing a plurality of products of event type scores with their respective event type weights.

9. The device of claim 8, wherein the event type scores comprise the encounter skill score and the win offset skill score.

10. The device of claim 9, wherein each event type skill score is updated in response to the end of a game based on the event data captured within the game and wherein the player skill score of each of the plurality of players is updated based on the updated event type skill score.

11. A method for generating dynamic events-based rankings on a remote and dynamic event-based ranking server comprising:

executing a game within a server with one or more networked-connected player clients until a game conclusion is reached;

processing a plurality of events within the executed game prior to the game conclusion, the plurality of events comprising real-time processing of in-game results of controller inputs communicatively coupled to a player client of the one or more networked-connected player clients;

capturing event data associated with the plurality of events;

updating player skill data based on the captured event data, wherein the update includes modification of a score using a variance value that determines a magnitude of score adjustment, wherein the variance value is higher for players with fewer completed games and for players who have not played within a predetermined time threshold, and wherein the variance value affects weighting applied to the captured event data in updating the score; and generate a set of rankings based on the updated player skill data.

12. The method of claim 11, wherein the plurality of events comprises two or more event types.

13. The method of claim 12, wherein the two or more event types comprises at least encounter type events and round type events.

14. The method of claim 13, further comprising player skill data comprising at least a plurality of player skill scores associated with the plurality of players.

15. The method of claim 14, further comprising at least a player encounter skill score associated with a player's past outcomes within an encounter type event.

16. The method of claim 15, further comprising at least a player win offset skill score associated with a player's past outcomes within a win offset type event.

17. The method of claim 16, further comprising weight-distribution data comprising a plurality of event type weights associated with a numerical contribution of each event type to a player skill score.

18. The method of claim 17, wherein the player skill score can be generated by summing a plurality of products of event type scores with their respective event type weights.

19. The method of claim 18, wherein the event type scores comprise the encounter skill score and the win offset skill score.

20. A non-transitory computer readable medium including software that, upon execution by a processor, performs operations comprising:

executing a game comprising a plurality of players with an associated player skill wherein the game is executed on a dynamic event-based ranking server that is remote with respect to a plurality of player devices;

processing a plurality of events within the executed game prior to the game conclusion, the plurality of events comprising real-time processing of in-game results of controller inputs provided through controllers each of which communicatively coupled to a corresponding player device of the plurality of player devices;

capturing event data associated with the plurality of events;

updating player skill data in response to the event data captured during the game, wherein the update includes modification of a score using a variance value that determines a magnitude of score adjustment, wherein the variance value is higher for players with fewer completed games and for players who have not played within a predetermined time threshold, and wherein the variance value affects weighting applied to the captured event data in updating the score; and generating a set of rankings based on the updated player skill data.

* * * * *